United States Patent [19]

Cousens, Jr.

[11] 4,190,218

[45] Feb. 26, 1980

[54] BIKE KITE

[76] Inventor: Michael Cousens, Jr., 1350 NW. 45th St., Miami, Fla. 33142

[21] Appl. No.: 960,231

[22] Filed: Nov. 13, 1978

[51] Int. Cl.² .................. A63H 27/08; B64C 31/06
[52] U.S. Cl. ..................... 244/155 R; 244/153 R; 280/289 R
[58] Field of Search ............... 244/153 R, 154, 155 R, 244/155 A, 113, 33; 280/289 R; D12/117, 114; D21/62, 88; 273/105.2, 105.3; 40/590; 46/77, 86 R

[56] References Cited

U.S. PATENT DOCUMENTS

| 3,614,132 | 10/1971 | Ashworth | 280/289 R |
| 3,993,323 | 11/1976 | Lussier | 280/289 R |

*Primary Examiner*—Barry L. Kelmachter
*Attorney, Agent, or Firm*—Daniel Jay Tick

[57] ABSTRACT

A ball joint is affixed to the harness of a kite and a kite string is tied at its first end to the ball joint. A kite tethering device is affixed to the frame of a bicycle for affixing the second end of the string to the bicycle. The kite tethering device comprises an elastic cord affixed at its first end to the second end of the kite string. A tubular member has a ball joint seat formed in a first end thereof for accommodating the ball joint. The elastic cord passes through the tubular member and out of such member at the second end thereof. A clamp affixed to the second end of the elastic cord is clamped to the frame of the bicycle between the seat and the rear wheel thereof whereby when the kite is not borne aloft, the elastic cord maintains the ball joint seated in the ball joint seat of the tubular member.

1 Claim, 6 Drawing Figures

U.S. Patent
Feb. 26, 1980
4,190,218
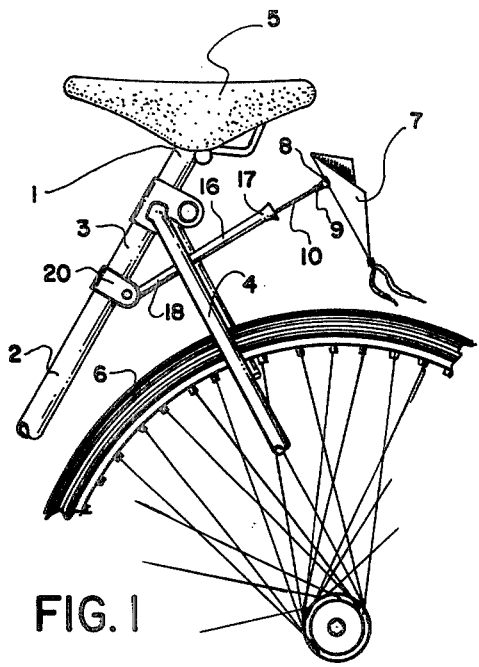
FIG. 1
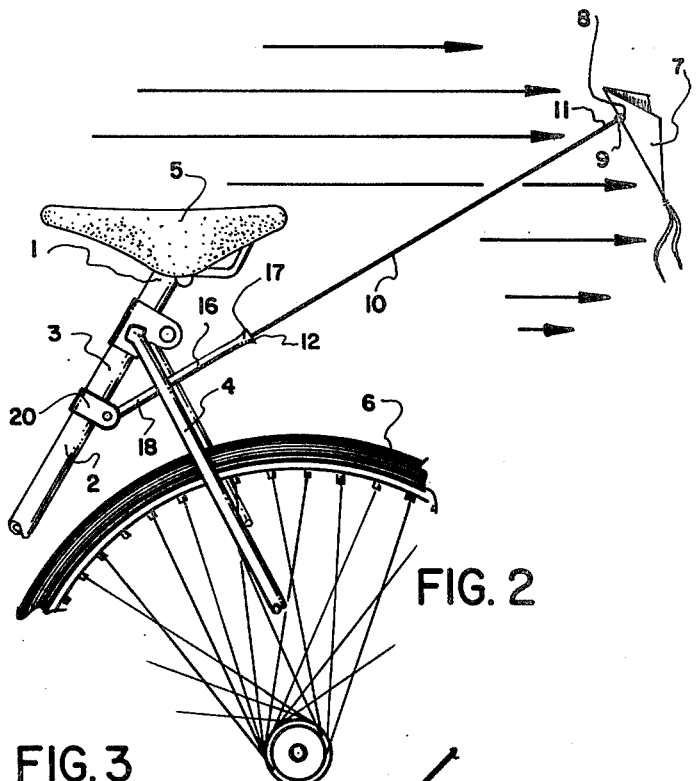
FIG. 2
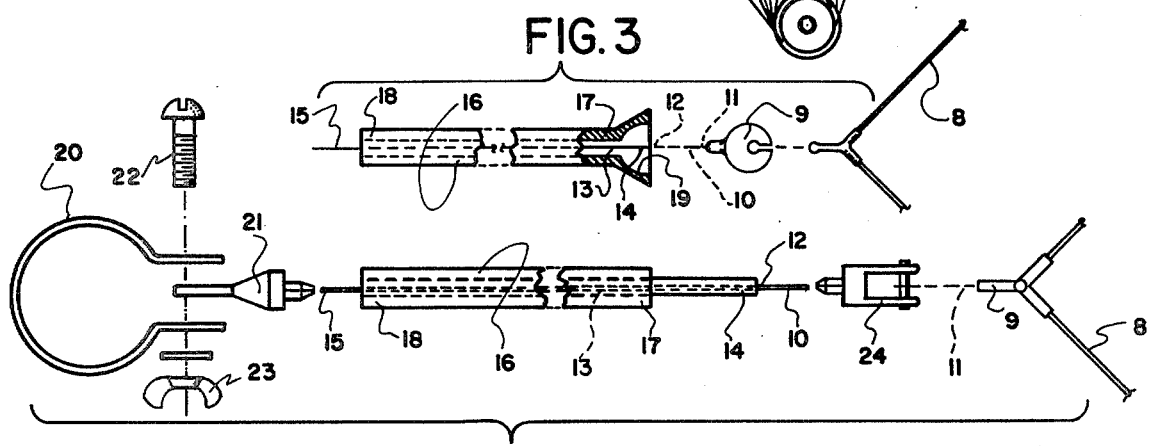
FIG. 3
FIG. 5
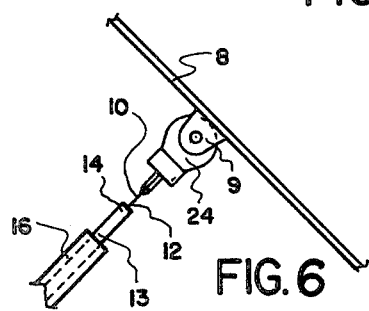
FIG. 6
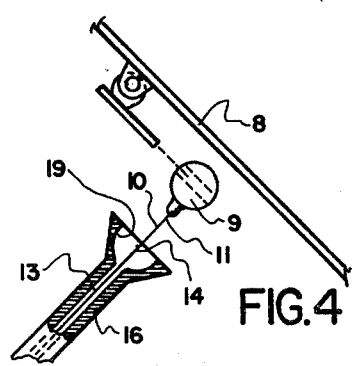
FIG. 4

BIKE KITE

BACKGROUND OF THE INVENTION

The present invention relates to a bike kite. More particularly, the invention relates to a bike kite flown from a bicycle during movement of the bicycle.

The principal object of the invention is to provide a bike kite which flies from a moving bicycle.

An object of the invention is to provide a bike kite of simple structure and is inexpensive in manufacture for flying a kite from a bicycle.

Another object of the invention is to provide a kite tethering device of simple structure for flying a kite from a bicycle.

Still another object of the invention is to provide a bike tethering device which is installed with facility and convenience on any bicycle for flying a kite from a bicycle.

Yet another object of the invention is to provide a kite tethering device of simple structure which is inexpensive in manufacture, installed with facility, convenience and rapidity on any bicycle and functions efficiently, effectively and reliably to fly a kite from a moving bicycle.

BRIEF SUMMARY OF THE INVENTION

In accordance with the invention, a bike kite flown from a bicycle during movement of the bicycle, the bicycle having a frame with a seat-supporting part and a rear wheel supporting part, a seat mounted on the seat-supporting part and a rear wheel rotatably mounted in the rear wheel supporting part, comprises a kite having a harness. A ball joint is affixed to the harness of the kite. A kite string has spaced opposite first and second ends and is tied at its first end to the ball joint on the harness of the kite. A kite tethering device is affixed to the frame of the bicycle for affixing the second end of the string to the bicycle. The kite tethering device comprises an elastic cord having a first end affixed to the second end of the kite string and a spaced opposite second end. A tubular member has spaced opposite first and second ends with a ball joint seat formed in the first end thereof for accommodating the ball joint. The elastic cord passes through the tubular member and out of the tubular member at the second end thereof. A clamping device is affixed to the second end of the elastic cord and clamped to the frame of the bicycle between the seat and the rear wheel thereof. When the kite is not borne aloft, the elastic cord maintains the ball joint seated in the ball joint seat of the tubular member.

BRIEF DESCRIPTION OF THE DRAWINGS

In order that the invention may be readily carried into effect, it will now be described with reference to the accompanying drawings, wherein:

FIG. 1 is a view of an embodiment of the bike kite of the invention as it is being launched;

FIG. 2 is a view of the embodiment of FIG. 1, aloft;

FIG. 3 is an exploded view, on an enlarged scale, partly cutaway and partly in section, of an embodiment of the kite tethering device of the bike kite of the invention;

FIG. 4 is a view, on an enlarged scale, partly cutaway and partly in section, of the embodiment of FIG. 3, in a plane perpendicular to that of FIG. 3;

FIG. 5 is an exploded view, on an enlarged scale, of another embodiment of the kite tethering device of the bike kite of the invention; and FIG. 6 is a view, on an enlarged scale, of the embodiment of FIG. 5, in a plane perpendicular to that of FIG. 5.

DETAILED DESCRIPTION OF THE INVENTION

The bike kite of the invention is flown from a bicycle 1 having a frame 2 with a seat-supporting part 3 and a rear wheel supporting part 4, as shown in FIGS. 1 and 2. The bicycle 1 has a seat 5 mounted on the seat-supporting part 3 and a rear wheel 6 rotatably mounted in the rear wheel supporting part 4, as shown in FIGS. 1 and 2.

The bike kite of the invention comprises a kite 7 (FIGS. 1 and 2) having a harness 8 (FIGS. 1 to 6).

A ball joint 9 is affixed to the harness 8 of the kite 7 (FIGS. 1 to 6).

A kite string 10 has spaced opposite first and second ends 11 (FIGS. 2 to 5) and 12 (FIGS. 2, 3, 5 and 6), respectively. The kite string 10 is tied at its first end 11 to the ball joint 9 on the harness 8 of the kite 7.

A kite tethering device is affixed to the frame 2 of the bicycle 1 for affixing the second end 12 of the string 10 to the bicycle. The kite tethering device comprises an elastic cord 13 (FIGS. 3 to 6) having a first end 14 affixed to the second end 12 of the kite string, as shown in FIGS. 3 to 6, and a spaced opposite second end 15 (FIGS. 3 and 5).

The kite tethering device further comprises a tubular member 16 having spaced opposite first and second ends 17 and 18, respectively (FIGS. 1 to 3 and 5), with a ball joint seat 19 formed in the first end thereof, as shown in FIGS. 3 and 4, for accommodating the ball joint 9. The elastic cord 13 passes through the tubular member 16 and out of said tubular member at the second end 18 of said tubular member and at the second end 15 of said elastic cord, as shown in FIGS. 3 and 5.

A clamp 20 (FIGS. 1, 2, and 5) is affixed to the second end 15 of the elastic cord 13 and clamped to the frame 2 of the bicycle 1 between the seat 5 and the rear wheel 6 thereof, as shown in FIGS. 1 and 2. The second end 15 of the elastic cord 13 is secured to an anchor device 21, as shown in FIG. 5, and the anchor device is secured to the clamp 20 via a bolt 22 and a wing nut 23, as shown in FIG. 5, after the clamp 20 is placed around the frame 2.

The elastic cord 13 functions to maintain the ball joint 9 seated in the ball joint seat 19 of the tubular member 16 when the kite 7 is at rest and not borne aloft. When the kite 7 is flying, or borne aloft, the force of the wind, which maintains the kite in flight, overcomes the force exerted by the elastic cord 13 and the kite has no difficulty in remaining in flight.

The embodiment of FIGS. 5 and 6 differs from the embodiment of FIGS. 3 and 4, in that an additional coupling or linking member 24 is included in the embodiment of FIGS. 5 and 6.

While the invention has been described by means of specific examples and in specific embodiments, I do not wish to be limited thereto, for obvious modifications will occur to those skilled in the art without departing from the spirit and scope of the invention.

I claim:

1. A bike kite flown from a bicycle during movement of said bicycle, said bicycle having a frame with a seat-supporting part and a rear wheel supporting part, a seat mounted on the seat-supporting part and a rear wheel rotatably mounted in the rear wheel supporting part, said bike kite comprising

- a kite having a harness;
- a ball joint affixed to the harness of the kite;
- a kite string having spaced opposite first and second ends, said kite string being tied at its first end to the ball joint on the harness of the kite; and
- kite tethering means affixed to the frame of the bicycle for affixing the second end of the string to the bicycle, said kite tethering means comprising an elastic cord having a first end affixed to the second end of the kite string and a spaced opposite second end, a tubular member having spaced opposite first and second ends with a ball joint seat formed in the first end thereof for accommodating the ball joint, said elastic cord passing through said tubular member and out of said tubular member at the second end thereof and clamping means affixed to the second end of the elastic cord and clamped to the frame of the bicycle between the seat and the rear wheel thereof whereby when the kite is not borne aloft, the elastic cord maintains the ball joint seated in the ball joint seat of the tubular member.

* * * * *